July 9, 1957     H. L. PENBERTHY     2,798,892
ELECTRODE ASSEMBLY
Filed Feb. 7, 1955

INVENTOR
HARVEY L. PENBERTHY

BY Strauch, Nolan & Diggins
ATTORNEYS

United States Patent Office 2,798,892
Patented July 9, 1957

2,798,892

ELECTRODE ASSEMBLY

Harvey L. Penberthy, Seattle, Wash.

Application February 7, 1955, Serial No. 486,560

6 Claims. (Cl. 13—17)

This invention relates to glass furnaces and more particularly to a novel arrangement for mounting and feeding electrodes into such furnaces.

In my application No. 371,858 now Patent No. 2,693,498, I have disclosed an electrode assembly for mounting electrodes in glass furnaces and cooling such electrodes. According to that invention the electrode passed through a relatively loose fitting bushing which was mounted in the tank block or wall in such a position as to be retracted from the inner face of the tank block. The bushing was mounted in a sleeve coaxial with the electrode which extended outwardly of the tank block and received a supply of coolant which was directed against the electrode and bushing.

I have now found that certain types of electrodes, such as those shown in the patent to Mochel, Serial No. 2,490,825, may be utilized with very little, if any, external cooling and that with such electrodes, as well as the electrodes of my aforementioned patent, adjustment of the electrodes into and out of the tank is greatly facilitated if heat is applied to the electrode exteriorly of the tank. This causes melting of the solid glass which surrounds the electrode at the bushing and permits an easy axial movement of the electrode.

It is accordingly a primary object of the present invention to provide an apparatus and method for facilitating the adjustment of electrodes mounted in the walls of glass furnaces.

It is another object of the present invention to provide a means and method for facilitating the adjustment of electrodes mounted in the walls of glass furnaces through the application of heat to such electrodes exteriorly of the furnace.

It is another object of the present invention to provide an electrode assembly which permits of rapid adjustment of the electrode position in the wall of a glass furnace.

It is a still further object of the present invention to provide a method for rapidly and easily adjusting the position of an electrode in the wall of a glass furnace.

Figure 1:
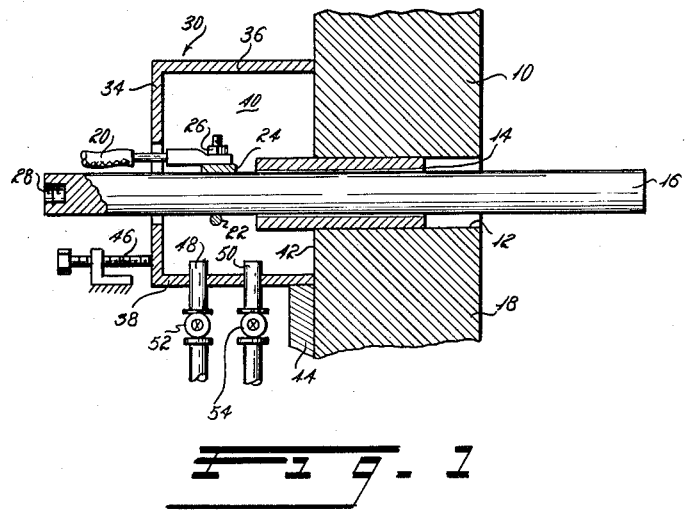
Figure 2:
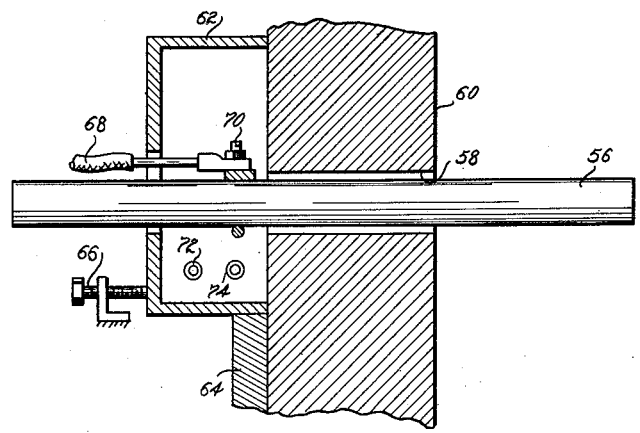

Further objects and advantages of the invention will become apparent upon reference to the following specification and claims and appended drawings wherein:

Figure 1 is a vertical cross sectional view of an electrode assembly according to one embodiment of the present invention; and Figure 2 is a vertical cross sectional view of an electrode assembly according to another embodiment of the invention.

Referring more particularly to the figures of the drawings, there is shown in Figure 1 a tank block or wall 10 having an aperture 12 therein to receive a sleeve 14 which may be of any suitable metal, such as steel. The sleeve 14 is retracted from the inner face 18 of the tank block or wall 10, so that the glass which enters the aperture 12 and contacts the end of the sleeve is at a temperature substantially below the temperature of the glass in the tank, and has an electrode 16 extending axially therethrough.

Glass tends to seep into the annular clearance between the electrode and the sleeve and solidifies there to form a seal preventing any leakage of molten glass from the tank.

A supply of electrical current to the electrode 16 is provided through a power cable 20 which is connected to the electrode by means of a U-bolt 22, a strap 24 and a pair of nuts 26. In order to provide for electrode replacement or adjustment without furnace shutdown the electrode is provided at its outermost ends with a threaded bore 28 which is adapted to receive a mating stud upon a new length of electrode; not shown.

Exteriorly of the furnace wall 10 there is provided an electrode furnace generally indicated at 30, having an opening 32 therein through which the cable 20 and electrode 16 pass. The furnace has an end wall 34, a top wall 36, a bottom wall 38 and side walls 40 which cooperate to form an enclosure open at one side, and this open side of the electrode furnace abuts the outer surface 42 of the furnace wall 10 to form a furnace chamber. The electrode furnace 30 is held in position by means of a support 44 for the lower wall 38 and a jack bolt 46 which urges the furnace into engagement with the outer surface of the wall 10. A number of burners 48 and 50 is provided in the bottom wall 38 of the electrode furnace 30 and these are supplied with any suitable combustible fuel through a pair of control valves 52 and 54.

In operation the sleeve assembly consisting of sleeve 14 and electrode 16 is placed in the aperture 12 in the tank block 10 and the electrode furnace 30 is firmly secured against the surface 42 of the tank block 10 by means of the jack bolt 46. When the glass charge of the furnace becomes molten, glass flows into the annular space surrounding the electrode 16 in the aperture 12 and a small amount flows into the space between the electrode and the sleeve 14. Since the temperature at this position is insufficiently high to maintain the glass in its molten condition, such glass freezes around the electrode thereby providing a glass and oxidation seal.

When it is desired to adjust the electrode into or out of the tank block 10, the valves 52 and 54 on the burners 48 and 50 are opened and the escaping fuel ignited to provide heat in the electrode furnace 30. The heat of combustion thus generated rapidly heats the exterior end of the electrode 16 and causes the glass frozen between the sleeve 14 and the electrode 16 to melt. The electrode may then easily be moved into or out of the furnace. In the event that a new electrode is to be inserted into the furnace the stud thereon is screwed into the threaded bore 28 and the electrode fed as a continuous rod into the furnace.

Referring to Figure 2 there is shown another embodiment of the invention wherein an electrode 56 is passed directly through an aperture 58 in a tank block or wall 60 without the use of a sleeve similar to sleeve 14 in Figure 1. With this type arrangement the molten glass flows into the annular space between the electrode 56 and aperture 58 until it reaches a point where the temperature is insufficiently high to retain it in a molten stage and it there solidifies to form a glass and oxidation seal.

As with the embodiment shown in Figure 1, the electrode 56 is provided with an electrode furnace 62 which is secured to the tank block by means of a support 64 and jack bolt 66. Electric current is supplied to the electrode through a cable 68 and connector 70 and the electrode furnace is provided with a pair of burners 72 and 74, which in this embodiment of the invention, are shown entering the side wall of the electrode furnace 62.

As with the previous embodiment of the invention, electrode adjustment is brought about by lighting the burners 72 and 74 to provide heat in the furnace 62. This causes a rapid melting of the glass between the electrode 56 and the aperture 58 so that the electrode may be axially moved either into or out of the tank block 60.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an electrode assembly in an apertured furnace wall, an electrode passing through said wall, an enclosure surrounding the periphery of said electrode adjacent said wall, and heat producing means in said enclosure.

2. In an electrode assembly in an apertured furnace wall, an electrode passing through said wall, an enclosure comprising a peripheral wall closed at one end by an end wall and open at the other end, said end wall having an aperture therein, said open end of said enclosure abutting said furnace wall and said electrode extending through said aperture in said end wall, and heat producing means within said enclosure.

3. In an electrode assembly in an apertured furnace wall, a sleeve entering said aperture, an electrode passing through said sleeve and said aperture and having a portion extending exteriorly of said wall, and furnace means associated with said exterior portion of said electrode for heating said electrode.

4. In an electrode assembly in an apertured furnace wall having inner and outer surfaces, an electrode passing through said wall and said surfaces, an enclosure surrounding the periphery of said electrode adjacent the outer surface of said wall, and means associated with said enclosure for producing heat within said enclosure.

5. An apparatus as set out in claim 4 wherein said means for producing heat comprises a fuel conduit attached to said enclosure for directing fuel into said enclosure.

6. An apparatus as set out in claim 5 in which said enclosure comprises a container open on one side and having that side in engagement with the outer surface of said wall, said container having an aperture in the wall thereof opposite said open side, said electrode passing through said aperture.

References Cited in the file of this patent

UNITED STATES PATENTS

| | | |
|---|---|---|
| 1,615,109 | Coe | Jan. 18, 1927 |
| 2,038,210 | Everett | Apr. 21, 1936 |
| 2,209,515 | Ehman et al. | July 30, 1940 |
| 2,355,761 | Upton | Aug. 15, 1944 |
| 2,405,673 | Scherl | Aug. 13, 1946 |
| 2,429,959 | Peake et al. | Oct. 28, 1947 |
| 2,490,825 | Mochel | Dec. 13, 1949 |
| 2,526,241 | La Burthe et al. | Oct. 17, 1950 |
| 2,693,498 | Penberthy | Nov. 2, 1954 |
| 2,697,125 | Douglas | Dec. 14, 1954 |

FOREIGN PATENTS

| | | |
|---|---|---|
| 99,936 | Sweden | Oct. 1, 1940 |